No. 743,483. PATENTED NOV. 10, 1903.
W. GENTRY.
TELLURIAN.
APPLICATION FILED DEC. 3, 1902.
NO MODEL. 3 SHEETS—SHEET 3.
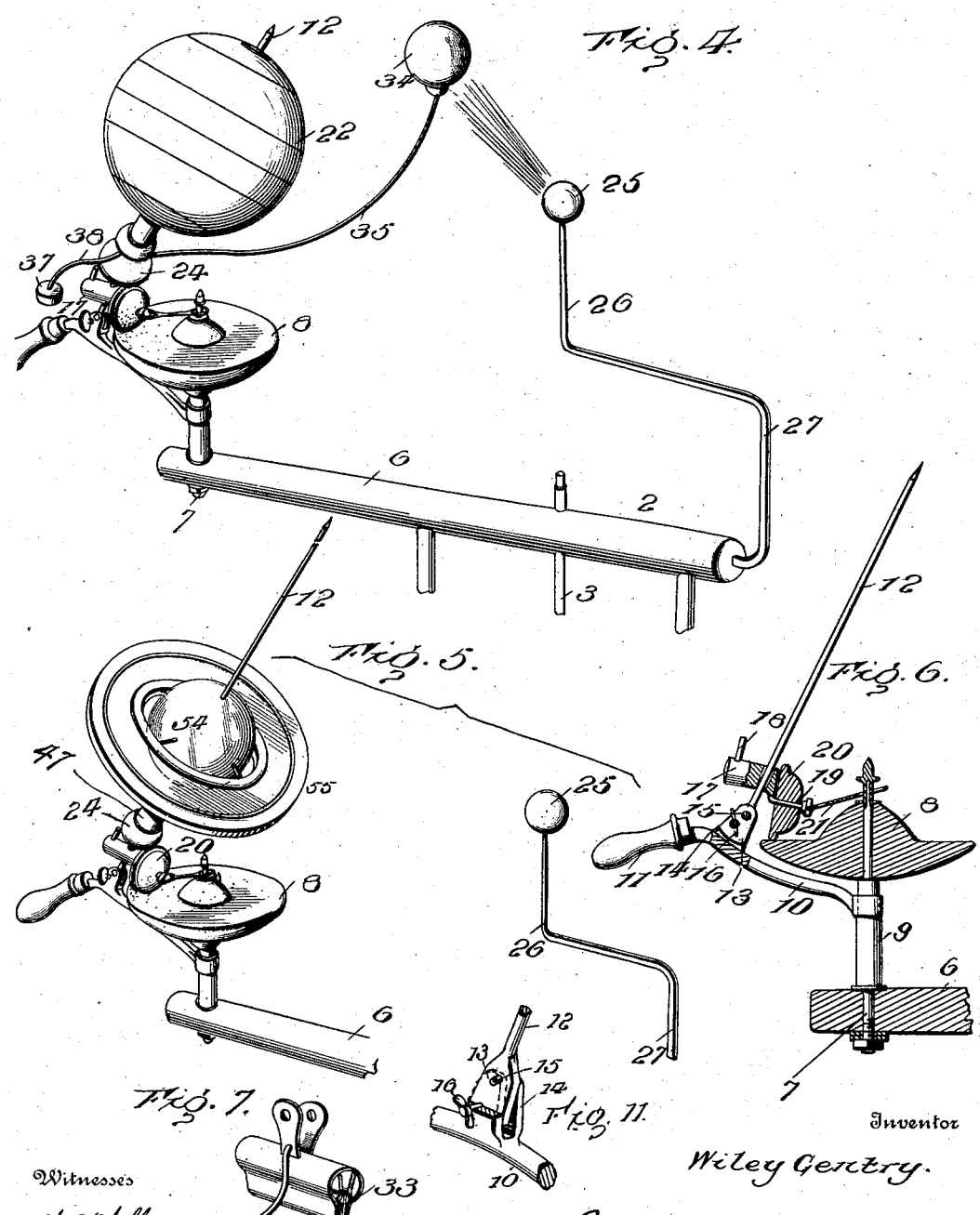
Witnesses
Inventor
Wiley Gentry.
Attorneys No. 743,433.                                    Patented November 10, 1903.

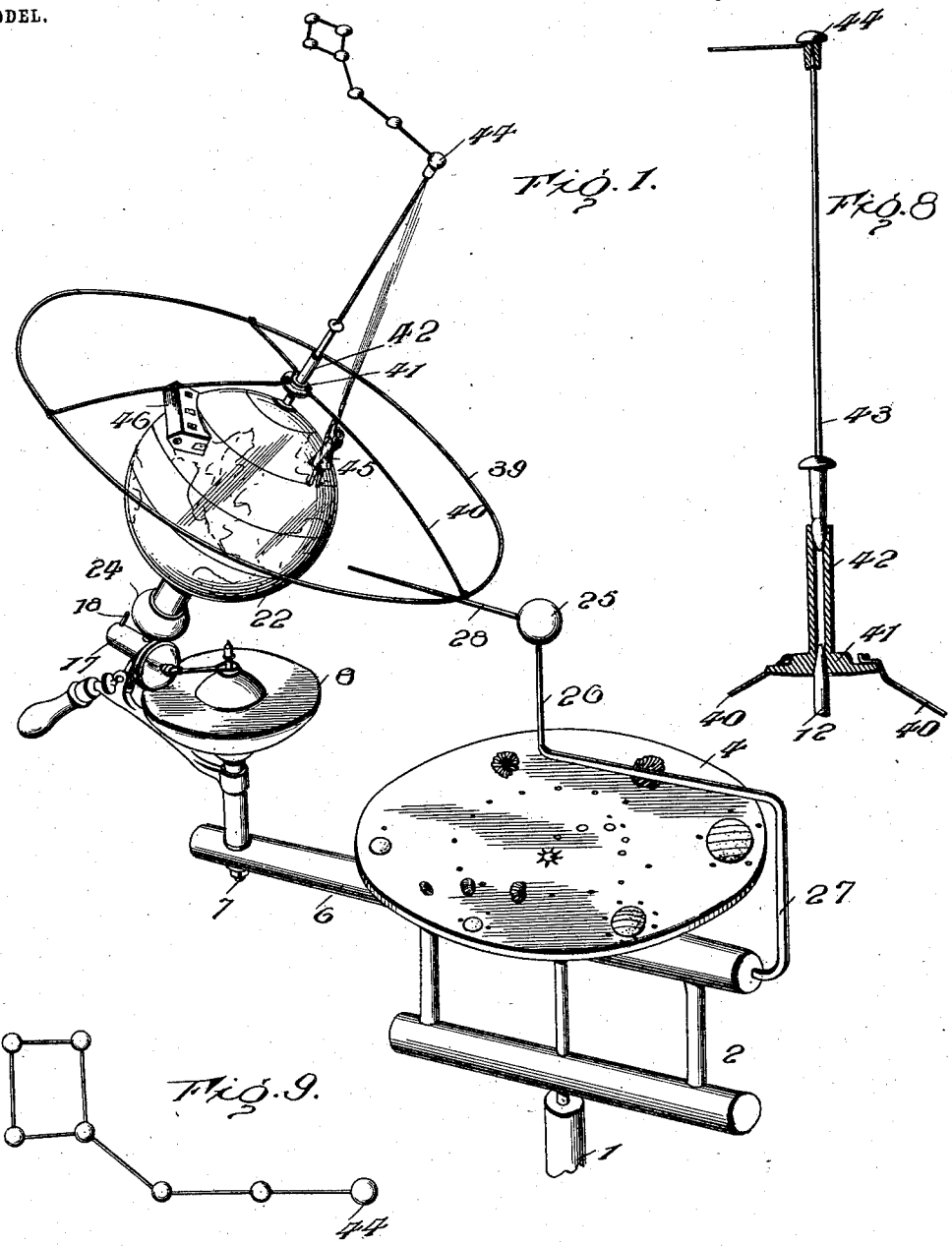

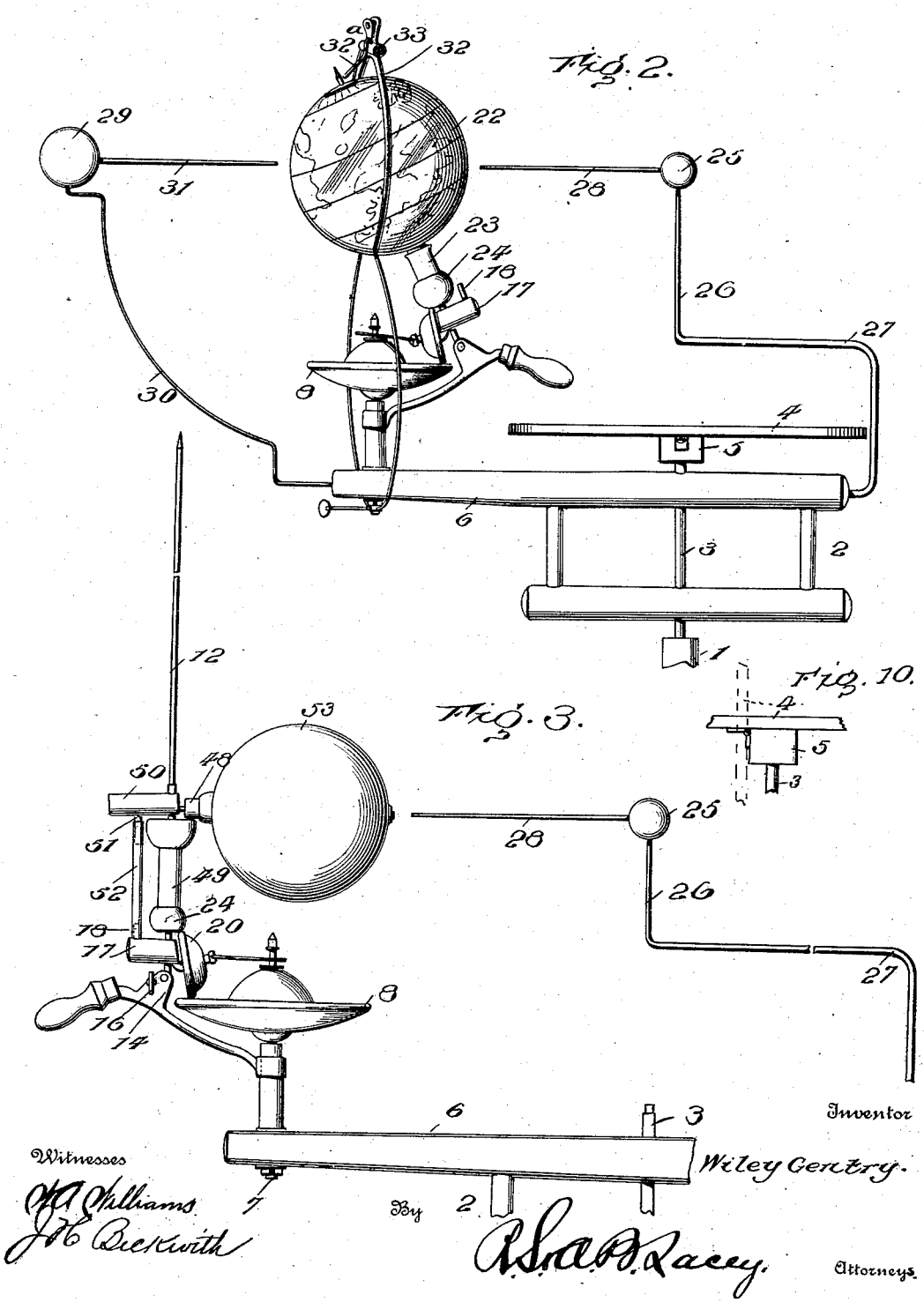

UNITED STATES PATENT OFFICE.

WILEY GENTRY, OF WATAUGA FALLS, NORTH CAROLINA.

TELLURIAN.

SPECIFICATION forming part of Letters Patent No. 743,483, dated November 10, 1903.

Application filed December 3, 1902. Serial No. 133,741. (No model.)

*To all whom it may concern:*

Be it known that I, WILEY GENTRY, a citizen of the United States, residing at Watauga Falls, in the county of Watauga and State of North Carolina, have invented certain new and useful Improvements in Tellurians, of which the following is a specification.

This invention relates to the class of apparatus designed to illustrate celestial and terrestrial phenomena, such as the phases of the moon, the relation of the planets to one another, the diurnal changes, the vernal and autumnal equinoxes, the annual seasons, the eclipses, the variation in the inclination of the earth's axis, and like well-known facts connected with the heavenly bodies and terrestrial sphere.

For a full description of the invention and the merits thereof and also to acquire a knowledge of the details of construction of the means for effecting the result reference is to be had to the following description and drawings hereto attached.

While the essential and characteristic features of the invention are susceptible of modification, still the preferred embodiment of the invention is illustrated in the accompanying drawings, in which—

Figure 1 is a perspective view of a tellurian embodying the invention. Fig. 2 is a side elevation, the moon-globe and the diurnal circle replacing the ring representing the moon's orbit and the constellation representing the seven pointers or little dipper. Fig. 3 is a view showing the planet Uranus in position. Fig. 4 is a perspective view illustrating the phases of the moon, the latter being in its first quarter. Fig. 5 is a perspective view showing the planet Saturn replacing the earth-globe. Fig. 6 is a detail view showing the sun-and-planet gearing in section. Fig. 7 is a perspective view of the north-pole pointer detachably fitted to the upper portion of the diurnal circle. Fig. 8 is a detail view of the means for supporting the ring representing the moon's orbit and the constellation designated as the "seven pointers" or "little dipper." Fig. 9 is a detail view of the seven pointers or little dipper. Fig. 10 is a detail view showing the manner of pivotally connecting the planisphere to its support, the full lines indicating the horizontal position of the planisphere and the dotted lines its vertical position. Fig. 11 is a detail perspective view showing the manner of pivotally and adjustably connecting the spindle to the stem provided with the operating-handle.

Corresponding and like parts are referred to in the following description and indicated in all the views of the drawings by the same reference characters.

The apparatus comprises a standard 1, which may be suitably supported in a perpendicular position, the foot or stand being omitted. A frame 2 is mounted upon the standard 1 so as to turn about a vertical axis 3 and may be of any construction. The vertical axis 3 may be a rod or post and is extended above the frame 2 to form a support for the planisphere 4, upon which is inscribed any illustrative matter, the same showing the relation of the sun, planets, fixed stars, and sun spots. The planisphere 4 is hinged in any determinate way to a cross-head 5, affixed to the upper end of the post or axis 3, thereby enabling the planisphere to be turned into an approximately vertical position for exhibiting to a class. The pivoted or rotatable frame 2 may be of any construction, and, as shown, comprises an arm 6, to which the several parts are attached, as will appear more fully hereinafter.

A rod 7 is firmly attached at its lower end to an end portion of the arm 6 and projects vertically therefrom, and the sun-gear 8 is secured thereto. A sleeve 9 is mounted upon the part 7 intermediate of the sun-gear 8 and arm 6 and is adapted to turn freely, and a stem 10 projects therefrom and is provided
with a grip 11. A spindle 12 is pivotally connected to the stem 10, so as to be adjusted to any desired angle within its range of movement with reference to the perpendicular, and this spindle is adapted to receive the several attachments, as will appear more fully hereinafter. Any means may be provided for securing the spindle 12 in the required adjusted position, and, as shown, the lower end of the spindle is flattened, as indicated at 13, and is confined between ears 14 of the stem 10 by means of a pivot-fastening 15. A clamp-screw 16, threaded into one of the ears 14, is adapted to bear against the flattened portion 13 and secure it and the spindle in the required position. A block 17 is loosely mounted upon the spindle 12 and is provided with an upwardly-extending projection 18 and an approximately horizontal extension 19, forming a journal upon which is mounted the planet-gear 20, a link 21 being pivoted to the outer end of the extension 19 and adapted to engage with the upper end of the post 7, so as to prevent turning of the block 17 upon the spindle 12. The block 17 is adapted to move upon the spindle 12 to adapt itself to the change of inclination thereof, and the peripheral portion of the planet-gear 20 is made rounding, so as to engage with the sun-gear 8 in such a manner as to insure rotation thereof at any angular adjustment of the spindle 12. The opening in the block 17 through which the spindle 12 passes is sufficiently large to admit of play of the spindle therein, whereby binding is obviated. The planet-gear 20 is adapted to turn freely upon the journal or extension 19 and receives motion from the sun-gear 8 when the frame 2 is turned about its axis 3 and the handle 11 held pointing in a given direction.

The earth-globe 22 is mounted upon the spindle 12 and is freely rotatable thereon, said spindle representing the axis of the earth. A stem 23 projects from the south pole of the earth-globe and terminates in a globular head 24, which is in mesh with the planet-gear 20 and receives motion therefrom. The sun-globe 25 is affixed to a vertical stem 26 in vertical alinement with the post or axis 3 of the rotatable frame 2, said stem forming a part of a bracket 27, adapted to be fitted at its lower end to the arm 6 of the frame 2. A pointer 28 projects horizontally from the sun-globe 25 and is perpendicular to the earth-globe 22. The moon-globe 29 is attached to the upper end of a bracket 30, applied to the opposite end of the arm 6, and a pointer 31 projects therefrom toward the pointer 28 and alines horizontally therewith. When the sun and moon globes are in position, as shown in Fig. 2, the changes in the seasons and in the length of the days may be demonstrated, as well as the vernal and autumnal equinoxes. The diurnal circle 32 encompasses the earth-globe and indicates the line dividing night from day, the portion of the earth facing the sun representing day and the half facing away from the sun being in darkness or experiencing night. The north-pole pointer 32ª is provided with a clip 33 of any construction by means of which it may be detachably fitted to the upper portion of the diurnal circle, as shown in Fig. 2, points to the north pole and indicates noon about the 21st day of June and also indicates noon in a part of the United States about the 22d day of December.

For demonstrating the phases of the moon a moon-globe 34 is provided and is connected by an arm 35 to a globular-shaped body 24, loosely mounted upon the spindle 12 and constituting a gear, so as to receive motion from the planet-gear 20 as the frame 2 is rotated about the axis 3, with the handle 11 pointing in a given direction. A counterbalancing-weight 37 is connected to the part 24 by a stem 38, so as to equalize the weight upon the spindle 12 and obviate lateral or torsional strain and insure correct movement of the parts in demonstrating the moon's phases.

The orbit of the moon is represented by the ring 39, which is connected by arms 40 to a collar 41, fitted upon the upper end of the spindle 12 and having a tubular stem 42 projected therefrom to receive the lower end of a standard 43, to the upper end of which is affixed the constellation known as the "seven pointers" or "little dipper," the north star 44 being in line with the standard 43. An observer standing upon the earth, as shown at 45, must needs lower the telescope in order to view the six pointers from the position shown in Fig. 1. An observer at the diametrically opposite side of the earth on a parallel of latitude gazing at the north star must of necessity raise the telescope in order to view the six pointers. This demonstrates why in one instance it is necessary to lower the telescope and in another instance to raise the telescope in order to view the six pointers when moving the telescope from a position in line with the north star.

It has been observed that in the summer season the rays of the sun shine into the north door or window of a house facing north and south both in the morning and evening. This is demonstrated by the object 46, representing a house facing north and south. In the morning the rays from the sun 25 enter the north door or window of the house at one angle, and in the evening the rays enter the same door or window at a different angle, this being due to the north side of the house facing the sun at diametrically opposite points.

In Fig. 5 the globe 54 and annulus 55 represent the planet Saturn and its rings placed upon the spindle 12 and provided with a stem 47, similar in construction to the stem of the earth-globe and in mesh with the planet-gear 20, so as to be rotated thereby in the revolution of the frame 2 about the axis 3. As shown in said figure, the planet and its rings face the sun, thereby illustrating the outline of the rings, the inner ethereal ring being in practice represented by a metal or material of contrasting color from the adjacent and the outer spaced rings.

Fig. 3 represents the planet Uranus 53 about in the plane of the ecliptic and having its axis at a right angle to the spindle 12, said planet having a stem 48 in mesh with a sleeve 49, loosely mounted upon the spindle 12 and deriving motion from the planet-gear 20. The globe 53, designating the planet Uranus, is mounted upon the spindle projected from a block 50, corresponding to the block 17 and loosely mounted upon the spindle 12 and having a pendent extension 51 connected by a tube 52 with the upright extension 18 of the block 17. This manner of mounting the planet Uranus holds it in the plane of the frame 2, while yet admitting of the planet turning about its axis when the frame 2 is revolved about its axis 3.

Having thus described the invention, what is claimed as new is—

1. In a tellurian, a frame revoluble about a vertical axis, a sun-gear mounted upon the frame, a spindle supported by said frame and adapted to have its inclination varied, a block loose upon the spindle and held from turning thereon, and a planet-gear journaled to said block and deriving motion from said sun-gear, substantially as described.

2. In a tellurian, a frame revoluble about a vertical axis, a sun-gear fixedly mounted upon the frame, a spindle supported by said frame and adapted to have its inclination varied, a block loose upon the spindle and prevented from turning thereon, and a planet-gear journaled to said block and in mesh with the sun-gear, substantially as and for the purpose specified.

3. In a tellurian, the combination of a sun-gear having a vertical axis, a stem mounted in coaxial alinement with said sun-gear, a spindle pivotally connected with said stem, means for securing the spindle in an adjusted position, and a planet-gear in mesh with the sun-gear and having its bearing loosely connected with said spindle but held from turning thereon, substantially as described.

4. In a tellurian, the combination of a sun-gear having a vertical axis, a stem mounted in coaxial alinement with said sun-gear, a spindle pivotally connected with said stem, means for securing the spindle in an adjusted position, a block loose upon the spindle, a planet-gear journaled to said block and in mesh with the sun-gear, and a link loosely connecting said block with the axis of the sun-gear to prevent turning of the block upon its spindle, substantially as specified.

5. In a tellurian, the combination of a sun-gear having a vertical axis, a stem mounted in coaxial alinement with said sun-gear, a spindle pivotally connected with said stem, means for securing the spindle in an adjusted position, a block loosely mounted upon the spindle and having an extension forming a journal, a planet-gear mounted upon said journal and in mesh with the sun-gear, and a link having pivotal connection with said journal and loose connection with the axis of the sun-gear, substantially as set forth.

6. In a tellurian, the combination of a vertical axis, a sun-gear mounted upon said axis, a stem loosely mounted upon said axis and provided with a grip constituting a handle, a spindle having pivotal connection with said stem, means for securing the spindle in an adjusted position, and a planet-gear having its mounting loosely connected with the spindle and having its peripheral portion made rounding so as to make positive connection with the sun-gear at all adjustments of the spindle, substantially as set forth.

7. In a tellurian, the combination of a frame revoluble about a vertical axis, a sun-gear fixedly mounted upon the frame, a stem mounted in coaxial alinement with the vertical axis of the sun-gear, a spindle pivotally connected with said stem, means for securing the spindle in an adjusted position, a planet-gear having its mounting loosely connected with the spindle, an arm provided at one end with a globe and having a gear at its opposite end loosely mounted upon the said spindle and deriving motion from the planet-gear, and a second globe mounted upon the spindle, substantially as set forth.

8. In a tellurian, the combination of a frame revoluble about a vertical axis, a fixed sun-gear carried by said frame, a stem mounted in coaxial alinement with the vertical axis of the sun-gear, a spindle pivotally connected with said stem, means for securing the spindle in an adjusted position, a planet-gear having its mounting loosely connected with the spindle, an earth-globe mounted upon the spindle and deriving motion from the planet-gear, a diurnal circle in the plane of the vertical axis of the sun-gear, and a north-pole pointer applied to the upper end of the diurnal circle, substantially as specified.

In testimony whereof I affix my signature in presence of two witnesses.

WILEY GENTRY. [L. S.]

Witnesses:
GENEVIEVE MATTHEWS,
JNO. ROBB.